(12) United States Patent
Denk et al.

(10) Patent No.: US 10,989,154 B2
(45) Date of Patent: Apr. 27, 2021

(54) FUEL INJECTOR WITH AN IDLE STROKE

(71) Applicant: Continental Automotive GmbH, Hannover (DE)

(72) Inventors: Frank Denk, Obertraubling (DE); Gerd Rösel, Regensburg (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 16/098,033

(22) PCT Filed: May 3, 2017

(86) PCT No.: PCT/EP2017/060494
§ 371 (c)(1),
(2) Date: Oct. 31, 2018

(87) PCT Pub. No.: WO2017/191170
PCT Pub. Date: Nov. 9, 2017

(65) Prior Publication Data
US 2019/0145334 A1 May 16, 2019

(30) Foreign Application Priority Data
May 3, 2016 (DE) .................... 10 2016 207 626.4

(51) Int. Cl.
*F02M 51/06* (2006.01)
*F02D 41/40* (2006.01)
(Continued)

(52) U.S. Cl.
CPC ....... *F02M 51/0685* (2013.01); *F02D 41/247* (2013.01); *F02D 41/40* (2013.01);
(Continued)

(58) Field of Classification Search
CPC .......... F02D 2041/2044; F02D 41/247; F02M 51/066; F02M 51/0685
See application file for complete search history.

(56) References Cited

U.S. PATENT DOCUMENTS 6,279,873 B1 * 8/2001 Eichendorf ........ F02M 51/0685
251/129.19
7,789,073 B2 * 9/2010 Miyake .................. F02D 41/20
123/490
(Continued)

FOREIGN PATENT DOCUMENTS

DE 10 2009 033 080 B3 12/2010 ............. F02D 41/20
DE 10 2014 225 886 A1 6/2016 ............. F02D 41/20
(Continued)

OTHER PUBLICATIONS

German Office Action, Application No. 10 2016 207 626.4, 5 pages, dated Dec. 12, 2016.
(Continued)

*Primary Examiner* — Kevin R Steckbauer
(74) *Attorney, Agent, or Firm* — Slayden Grubert Beard PLLC

(57) ABSTRACT

Various embodiments may include a method for actuating a fuel injector with a solenoid drive and a nozzle needle. The solenoid drive has a solenoid and a movable armature. The fuel injector has an idle stroke between the armature and the nozzle needle. An example method includes: applying a precharging current to the solenoid drive during a precharging phase to move the movable armature into mechanical contact with the nozzle needle; and applying a voltage pulse to the solenoid drive during a boost phase until the current intensity of the current flowing through the solenoid reaches a predetermined peak value.

6 Claims, 1 Drawing Sheet

(51) Int. Cl.
*H01F 7/18* (2006.01)
*F02D 41/24* (2006.01)
*F02D 41/20* (2006.01)

(52) U.S. Cl.
CPC ......... *F02D 41/402* (2013.01); *F02M 51/066* (2013.01); *F02M 51/0625* (2013.01); *H01F 7/1805* (2013.01); *F02D 41/20* (2013.01); *F02D 2041/2003* (2013.01); *F02D 2041/2044* (2013.01); *F02D 2041/2048* (2013.01); *F02D 2041/2055* (2013.01); *F02D 2041/2058* (2013.01); *F02D 2200/063* (2013.01); *F02M 51/061* (2013.01); *Y02T 10/40* (2013.01)

(56) References Cited

U.S. PATENT DOCUMENTS

| | | | | |
|---|---|---|---|---|
| 8,128,009 | B2* | 3/2012 | Shingu | F02M 51/061 239/585.1 |
| 9,448,260 | B2* | 9/2016 | Rosel | G01R 19/0084 |
| 9,765,723 | B2* | 9/2017 | Imai | F02M 61/1846 |
| 9,835,105 | B2* | 12/2017 | Yanoto | F02D 41/20 |
| 10,087,876 | B2* | 10/2018 | Imai | F02D 41/20 |
| 10,197,002 | B2* | 2/2019 | Tanaka | F02M 51/061 |
| 10,247,125 | B2* | 4/2019 | Aono | F02D 41/20 |
| 2009/0289131 | A1* | 11/2009 | Shingu | F02M 51/066 239/585.5 |
| 2010/0186708 | A1* | 7/2010 | Ricco | F02M 63/004 123/299 |
| 2010/0193036 | A1 | 8/2010 | Haggenmiller et al. | 137/1 |
| 2012/0097133 | A1 | 4/2012 | Beer et al. | 123/490 |
| 2012/0318883 | A1* | 12/2012 | Kusakabe | F02D 41/20 239/1 |
| 2013/0197837 | A1* | 8/2013 | Rosel | G01R 19/0084 702/64 |
| 2016/0237937 | A1* | 8/2016 | Kusakabe | F02D 41/402 |
| 2017/0051696 | A1* | 2/2017 | Mukaihara | F02M 51/0653 |
| 2017/0191437 | A1* | 7/2017 | Yanoto | F02D 41/20 |
| 2017/0226950 | A1* | 8/2017 | Tanaka | F02D 41/20 |
| 2017/0335787 | A1* | 11/2017 | Aono | F02D 41/20 |
| 2018/0017005 | A1* | 1/2018 | Kusakabe | F02D 41/3064 |
| 2019/0024602 | A1* | 1/2019 | Hauser | F02D 41/20 |
| 2019/0078530 | A1* | 3/2019 | Burgmair | F02D 41/0027 |

FOREIGN PATENT DOCUMENTS

| | | | |
|---|---|---|---|
| JP | 2009162115 A | 7/2009 | F02D 41/20 |
| JP | 2017-020478 A | 1/2017 | F02D 41/04 |
| KR | 20110135920 A | 12/2011 | F02D 41/20 |
| KR | 20130115269 A | 10/2013 | F02D 41/20 |
| WO | 2009/040304 A1 | 4/2009 | F02D 41/20 |
| WO | 2016/021122 A1 | 2/2016 | F01D 41/20 |
| WO | 2017/191170 A1 | 11/2017 | F02D 41/20 |

OTHER PUBLICATIONS

International Search Report and Written Opinion, Application No. PCT/EP2017/060494, 22 pages, dated Aug. 3, 2017.
Korean Office Action, Application No. 20187034580, 7 pages, dated Sep. 20, 2019.
Korean Notice of Allowance, Application No. 2020043740534, 3 pages, dated Jun. 26, 2020.

* cited by examiner

FUEL INJECTOR WITH AN IDLE STROKE

CROSS-REFERENCE TO RELATED APPLICATIONS

This application is a U.S. National Stage Application of International Application No. PCT/EP2017/060494 filed May 3, 2017, which designates the United States of America, and claims priority to DE Application No. 10 2016 207 626.4 filed May 3, 2016, the contents of which are hereby incorporated by reference in their entirety.

TECHNICAL FIELD

The present disclosure relates to internal combustion engines. Various embodiments of the teachings herein may include methods for actuating a fuel injector with an idle stroke for an internal combustion engine of a motor vehicle, wherein the fuel injector has a solenoid drive, comprising a solenoid and a movable armature, and a movable nozzle needle.

BACKGROUND

During operation of directly operated fuel injectors having a solenoid drive (also referred to as coil injectors) with the same actuation parameter values (in particular current and voltage values), electrical, magnetic and mechanical tolerances generally result in different temporal opening and closing behaviors of the individual injectors and therefore in variations in the respective injection quantity. The relative differences in injection quantity from one injector to another become larger as the injection times become shorter. Up until now, these relative differences in quantity were small and without practical significance. However, development in the direction of relatively small injection quantities and injection times means that the influence of the relative differences in quantity can no longer be ignored.

In practice, a specific temporal voltage or current profile is applied to a fuel injector, said profile usually beginning with a boost phase in respect of the opening process. Actuation ends directly after the boost phase for so-called hydraulically ballistic operation (in which the fuel injector is not completely opened), wherein at least one first holding phase and possibly also a second holding phase (the actual holding phase) follows/follow for so-called hydraulically static operation (in which the fuel injector is completely opened and held open for a while).

Injector concepts with an idle stroke have proven advantageous for hydraulically static operation, in particular at high rated operating pressures of, for example, 500 bar. The electrical energy required, e.g., the electric boost current, can be low since the process of beginning hydraulic opening is driven not only by the applied magnetic force but rather additionally by the armature pulse. If a fuel injector of this kind with an idle stroke is now used in hydraulically ballistic operation, fuel injection takes place, under certain circumstances, by way of opening being driven only by the armature pulse and the current which generates the magnetic force already being switched off. In this case, the injection quantities are subject to a relatively high degree of scatter, this probably being attributable to the lack of magnetic force and associated stability.

SUMMARY

The teachings of the present disclosure may be embodied in methods with improved actuation for hydraulically ballistic operation of idle stroke injectors, which actuation can reduce or minimize the abovementioned problems in respect of scatter in particular. For example, some embodiments may include a method for actuating a fuel injector, which has a solenoid drive and a nozzle needle, for an internal combustion engine of a motor vehicle, wherein the solenoid drive has a solenoid and a movable armature, wherein the fuel injector has an idle stroke between the armature and the nozzle needle, the method comprising: applying a precharging current to the solenoid drive during a precharging phase in order to bring the movable armature into mechanical contact with the nozzle needle, and applying a voltage pulse to the solenoid drive during a boost phase until the current intensity of the current flowing through the solenoid reaches a predetermined peak value.

In some embodiments, the predetermined peak value is selected such that the nozzle needle carries out a ballistic movement.

In some embodiments, the method includes once again applying the precharging current to the solenoid drive in order to keep the movable armature in mechanical contact with the nozzle needle.

In some embodiments, the method includes applying a further voltage pulse to the solenoid drive during a further boost phase until the current intensity of the current flowing through the solenoid reaches a further predetermined peak value.

In some embodiments, the further predetermined peak value is selected such that the nozzle needle carries out a further ballistic movement.

In some embodiments, the further predetermined peak value is equal to the predetermined peak value.

In some embodiments, the precharging current is selected such that substantially no movement of the nozzle needle takes place during the precharging phase.

As another example, some embodiments include an engine controller for a vehicle, which engine controller is designed to use a method as described above.

As another example, some embodiments include a computer program which, when it is executed by a processor, is designed to carry out the method as described above.

BRIEF DESCRIPTION OF THE DRAWINGS

Further advantages and features of embodiments of the teachings herein can be found in the exemplary description of an example embodiment which follows, wherein.

Figure 1:
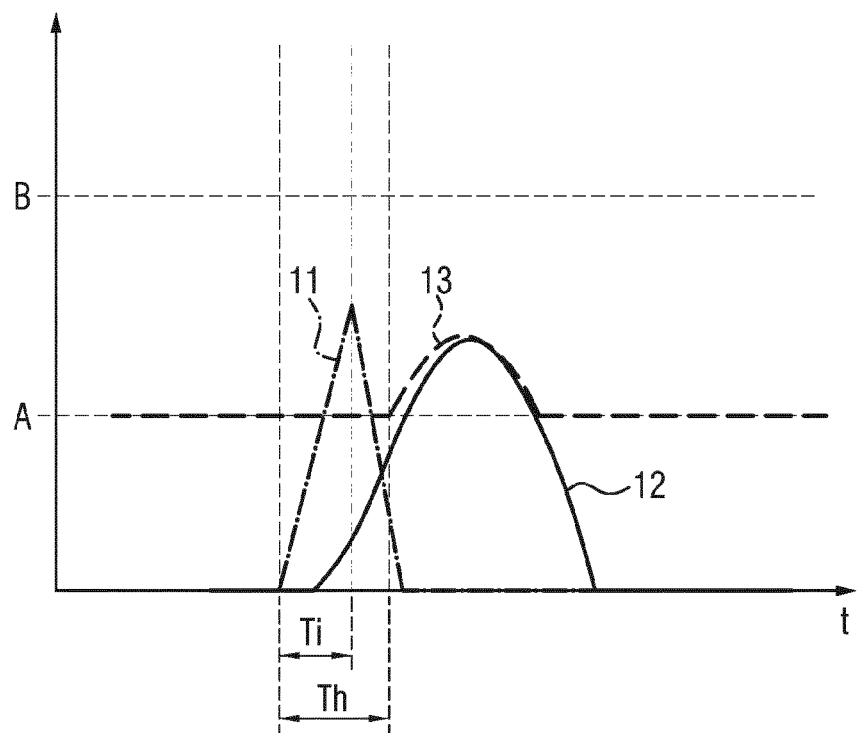
FIG. 1 shows an illustration of coil current, armature movement, and nozzle needle movement in the event of conventional actuation of a fuel injector with an idle stroke during ballistic operation.

It should be noted that the embodiments described below are merely a limited selection of possible variant embodiments of the teachings herein.

DETAILED DESCRIPTION

Some embodiments include a method for actuating a fuel injector, which has a solenoid drive and a nozzle needle, for an internal combustion engine of a motor vehicle, wherein the solenoid drive has a solenoid and a movable armature, wherein the fuel injector has an idle stroke between the armature and the nozzle needle. An example method comprises the following: (a) applying a precharging current to the solenoid drive during a precharging phase in order to bring the movable armature into mechanical contact with the nozzle needle, and (b) applying a voltage pulse to the solenoid drive during a boost phase until the current intensity of the current flowing through the solenoid reaches a predetermined peak value. The scatter of the injection quantities in the case of fuel injectors with an idle stroke is considerably reduced or counteracted by moving the injector to a state without an idle stroke.

In this application, "boost phase" refers to a phase of actuation of a fuel injector in which a voltage (for example approximately 65 V) which is elevated (in comparison to the battery voltage which is typically 12 V for example) is applied to the fuel injector. The boost phase serves to create or initiate rapid opening of the fuel injector and is terminated by the current intensity of the current flowing through the solenoid reaching a predetermined peak value (also called peak current).

In some embodiments, the method begins with a precharging phase in which the movable armature of the fuel injector is brought into mechanical contact with the nozzle needle in the sense that the armature is moved from its inoperative position without a large or substantial pulse out of the idle stroke to the position in which the hydraulically active nozzle needle remains. In other words, the fuel injector is moved to the so-called OPP1 state during the precharging phase. In the process, the precharging current is preferably kept so low that the armature is gently placed against the nozzle needle and remains there for the time being. This can be performed, for example, by current regulation, wherein a suitably low coil voltage is alternately switched on and switched off.

In some embodiments, the precharging phase is followed by a boost phase. In a boost phase, an (elevated) voltage pulse is applied to the solenoid drive, this lasting until a predetermined peak value of the coil current is reached, following which the voltage is switched off, and therefore the current intensity can drop again. As a result, the fuel injector is at least partially opened and releases a certain injection quantity. Owing to the previously carried out precharging phase, the starting conditions for the opening process are well defined here and scatter of the injection quantity (between injection processes with one fuel injector and also between injection processes of different fuel injectors with the same injection parameters) will be very low or negligible.

In some embodiments, the predetermined peak value is such that the nozzle needle carries out a ballistic movement. In other words, the predetermined peak value is selected to be so low that the nozzle needle follows a parabolic path and does not stop at the top (against the pole piece). Therefore, the fuel injector is not completely open.

In some embodiments, the method further comprises once again applying the precharging current to the solenoid drive in order to keep the movable armature in mechanical contact with the nozzle needle. In such embodiments, the movable armature is moved back into the position achieved by the precharging phase here, so that a subsequent injection operation can take place under similar or identical starting conditions. In some embodiments, this includes suitable regulation which allows the current intensity to drop down to the precharging current and then allows said current intensity to remain at this value.

In some embodiments, the method further comprises applying a further voltage pulse to the solenoid drive during a further boost phase until the current intensity of the current flowing through the solenoid reaches a further predetermined peak value. In such embodiments, a further injection operation takes place, wherein scatter in the injection quantity is avoided in a similar way as in the case of the preceding injection operation.

In some embodiments, the further predetermined peak value is such that the nozzle needle carries out a further ballistic movement.

In some embodiments, the further predetermined peak value is equal to the predetermined peak value. Therefore, in this case, two substantially identical injection operations follow one another.

In some embodiments, the precharging current is such that substantially no movement of the nozzle needle takes place during the precharging phase. In other words, the precharging current is selected such that the armature is moved smoothly in the direction of the nozzle needle and gently stops and is braked there.

Some embodiments include an engine controller for a vehicle, which engine controller is designed for using a method as described above and/or one of the above exemplary embodiments. The engine controller renders it possible to achieve injection quantities with a very low degree of scatter in a simple manner by way of using the method according to the first aspect.

Some embodiments include a computer program which, when executed by a processor, carries out a method incorporating the teachings herein. Within this document, a computer program is equivalent to a program element, a computer program product, and/or a computer-readable medium which contains instructions for controlling a computer system, in order to coordinate the manner of operation of a system or of a method in a suitable manner, in order to achieve the effects associated with the methods described herein. The computer program can be implemented as a computer-readable instruction code in any suitable programming language, such as JAVA, C++ etc. for example. The computer program can be stored on a computer-readable storage medium (CD-ROM, DVD, Blu-ray disk, removable drive, volatile or non-volatile memory, integral memory/processor etc.). The instruction code can program a computer or other programmable devices, such as in particular a control unit for an engine of a motor vehicle, in such a way that the desired functions are executed. Furthermore, the computer program can be provided in a network such as, for example, the Internet, from which a user can download it as required. The teachings can be practiced both by means of a computer program, i.e. software, and also by means of one or more specific electrical circuits, i.e. as hardware or in any desired hybrid form, i.e. by means of software components and hardware components.

It should be noted that embodiments of the teachings herein have been described. In particular, some embodiments are described by way of method claims and other embodiments are described by way of apparatus claims. However, it becomes immediately clear to a person skilled in the art upon reading this application that, unless explicitly stated otherwise, in addition to a combination of features which are associated with one type of subject matter of the invention, any combination of features which are associated with different types of subjects is also possible.

FIG. 1 shows an illustration of coil current 11, armature movement 12, and nozzle needle movement 13 in the event of conventional actuation of a fuel injector with an idle stroke during ballistic operation. Specifically, FIG. 1 shows a current profile 11 (as a function of time t) which increases starting from a specific time until a peak value is reached.

The duration of this boost phase is identified by Ti. Shortly after the boost phase begins, the armature moves upward and then substantially describes a parabolic movement, as is illustrated with reference to curve 12. The nozzle needle is moved only after a time period, identified by Th, starting from the beginning of the boost phase by way of the armature reaching the inoperative position A of the nozzle needle and carrying the nozzle needle with it. The nozzle needle then also describes a parabolic movement, as is illustrated with reference to curve 13. The completely open position of the fuel injector, which is identified by B, is not reached.

Figure 2:
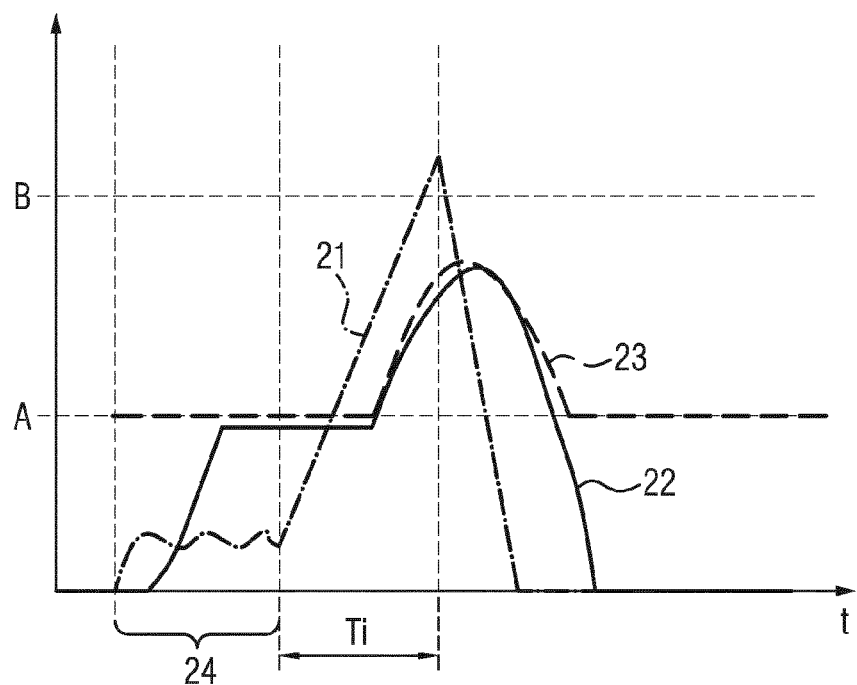
FIG. 2 shows an illustration of coil current, armature movement, and nozzle needle movement in the event of actuation of a fuel injector with an idle stroke during ballistic operation incorporating teachings of the present disclosure.

FIG. 2 shows an illustration of coil current 21, armature movement 22 and nozzle needle movement 23 in the event of actuation according to the invention of a fuel injector with an idle stroke during ballistic operation. Specifically, the actuation according to the invention begins with a precharging phase 24 in which the coil current 21 is regulated at a relatively low value which, however, suffices to move the armature 22 smoothly as far as the inoperative position of the nozzle needle A. This is followed by a boost phase Ti in which the current intensity 21 increases until the peak value (peak current) is reached.

After approximately half the duration of the boost phase Ti, the armature and nozzle needle, together, move along a parabolic movement curve. In the embodiment illustrated in FIG. 2, the coil current 21 returns to its starting value prior to the precharging phase (that is to say 0A), so that the armature also returns to its starting position again. However, it should be mentioned that, in some embodiments, the coil current 21 returns only as far as the initially set precharging current, so that the armature remains in contact with the nozzle needle (position A) after the injection process and therefore a subsequent injection operation can be performed under similar conditions to that of the first injection operation.

LIST OF REFERENCE SYMBOLS

11 Current profile
12 Armature position
13 Nozzle needle position
A Starting position of the nozzle needle
B Topmost position of the nozzle needle
t Time
Ti Boost phase
Th Time interval
21 Current profile
22 Armature position
23 Nozzle needle position
24 Precharging phase
A Starting position of the nozzle needle
B Topmost position of the nozzle needle
t Time
Ti Boost phase

What is claimed is:

1. A method for actuating a fuel injector with a solenoid drive and a nozzle needle, wherein the solenoid drive has a solenoid and a movable armature and the fuel injector has an idle stroke between the armature and the nozzle needle, the method comprising:

applying a precharging current to the solenoid drive during a precharging phase of a first injection cycle to move the movable armature into mechanical contact with the nozzle needle;

applying a voltage pulse to the solenoid drive during a boost phase of the first injection cycle until the current intensity of the current flowing through the solenoid reaches a predetermined peak value; and upon the current reaching the predetermined peak value, immediately switching off the voltage pulse to zero volts and completing the first injection cycle while maintaining zero volts applied to the solenoid drive through a remainder of the first injection cycle.

2. The method as claimed in claim 1, wherein the predetermined peak value is such that the nozzle needle carries out a ballistic movement.

3. The method as claimed in claim 1, further comprising applying the precharging current to the solenoid drive a second time to keep the movable armature in mechanical contact with the nozzle needle.

4. The method as claimed in claim 1, wherein the precharging current is such that any movement of the nozzle needle during the precharging phase does not result in any fuel exiting the fuel injector past the nozzle needle.

5. An engine controller for a vehicle including a fuel injector with a solenoid drive and a nozzle needle, the engine controller comprising:

a processor;

a memory in communication with the processor; and a program stored in the memory comprising instructions executable by the processor to:

apply a precharging current to the solenoid drive during a precharging phase of a first injection cycle to move the movable armature into mechanical contact with the nozzle needle;

apply a voltage pulse to the solenoid drive during a boost phase of the first injection cycle until the current intensity of the current flowing through the solenoid reaches a predetermined peak value; and upon the current reaching the predetermined peak value, immediately switching the voltage pulse to zero volts and completing the first injection cycle while maintaining zero volts applied to the solenoid drive through a remainder of the first injection cycle.

6. A non-transitory memory storing a computer program for actuating a fuel injector with a solenoid drive and a nozzle needle, which, when it is executed by a processor:

applies a precharging current to the solenoid drive during a precharging phase of a first injection cycle to move the movable armature into mechanical contact with the nozzle needle;

applies a voltage pulse to the solenoid drive during a boost phase of the first injection cycle until the current intensity of the current flowing through the solenoid reaches a predetermined peak value; and upon the current reaching the predetermined peak value, immediately switching the voltage pulse to zero volts and completing the first injection cycle while maintaining zero volts applied to the solenoid drive through a remainder of the first injection cycle.

* * * * *